D. O. PARISH.
ANTISKIDDING DEVICE.
APPLICATION FILED DEC. 12, 1916.
1,256,160.
Patented Feb. 12, 1918.
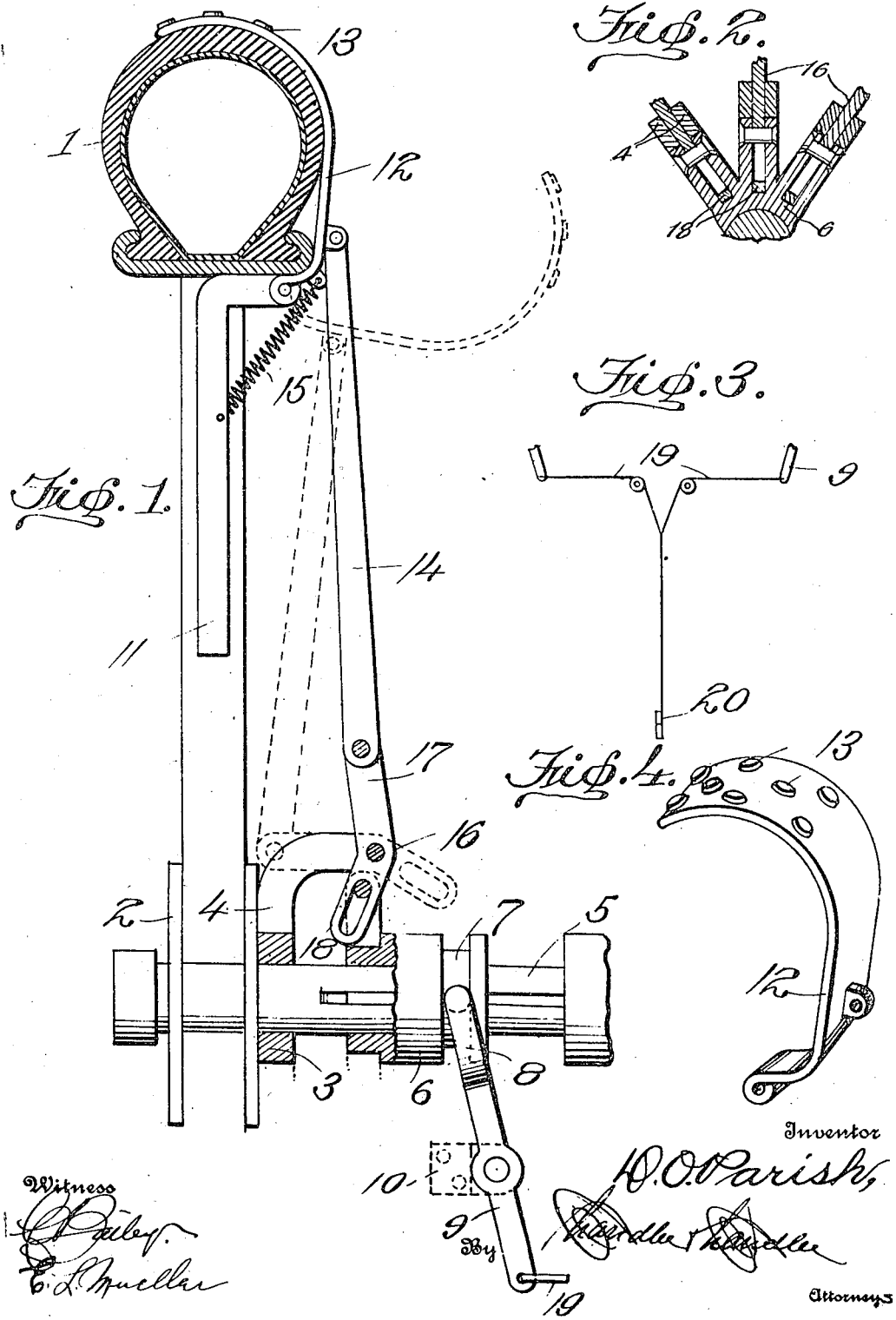

UNITED STATES PATENT OFFICE.

DURFEE O. PARISH, OF LEROY, COLORADO.

ANTISKIDDING DEVICE.

1,256,160. Specification of Letters Patent. Patented Feb. 12, 1918.

Application filed December 12, 1916. Serial No. 136,568.

*To all whom it may concern:*

Be it known that I, DURFEE O. PARISH, a citizen of the United States, residing at Leroy, in the county of Logan, State of Colorado, have invented certain new and useful Improvements in Antiskidding Devices; and I do hereby declare the following to be a full, clear, and exact description of the invention, such as will enable others skilled in the art to which it appertains to make and use the same.

The present invention is directed to improvements in anti-skidding devices for motor vehicles, and has for its object to provide a device of this character so constructed that the driver of the vehicle can upon operating a lever simultaneously operate a plurality of shoes to position the same transversely of the tires of the rear wheels to prevent the wheels from slipping when turning corners or traveling over wet pavements.

A further object of the invention is to provide a device of this character constructed in such a manner that it can be conveniently attached to an automobile already in use, and when in place thereon can be easily and quickly operated to prevent skidding of the machine.

With these and other objects in view, this invention resides in the novel features of construction, formation, combination and arrangement of parts to be hereinafter more fully described, claimed, and illustrated in the accompanying drawing in which:—

Figure 1 is a side elevation of a wheel showing the same equipped with the device.

Fig. 2 is a sectional view taken through a portion of the shoe actuating mechanism.

Fig. 3 is a plan view of the operating means for said mechanism.

Fig. 4 is a detail perspective view of one of the shoes.

Referring to the drawing 1 indicates one of the rear wheels of an automobile which is supported by the rear axle in the usual manner. Fixed to the hub 2 of the wheel is a collar 3, provided with a plurality of arms 4, the purpose of which will appear later.

Slidable on the axle casing 5 is a sleeve 6, said sleeve having a groove 7 formed therein which is engaged by the fork 8 of the shifting lever 9, said lever being pivotally engaged with the bracket 10 carried by the automobile.

Engaged between the spokes of the wheel 1 and extending longitudinally thereof are plates 11, having pivotally connected to their outer ends arcuate shoes 12, provided with calks 13. Rods 14 have outer ends connected with the shoes 12 so that when the rods are moved with their inner ends away from the wheel hub the shoes will be swung outwardly and will lie transversely of the tires of the rear wheels. Coil springs 15 connect the shoes 12 with the plates 11 and serve to return the shoes to their inoperative position when the rods 14 are released.

Pivotally supported by the arms 4 are bell crank levers 16, the arms 17 thereof being pivotally connected to the inner ends of the rods 14, while the arms 18 are pivotally connected to the sleeves 6. The shifting levers 9 are connected to the rear ends of the wires 19, while the forward ends of said wire are connected with the hand lever 20 which is supported in convenient reach of the driver.

From the foregoing description it will be seen that when the lever 20 is shifted in one direction that the wires 19 will be pulled so as to move the shifting levers 9 in a direction to shift the sleeves in a direction to rock the bell crank levers 16, thereby moving the rods 14 to swing the shoes 12 transversely of the tires. It will be of course understood that the lever can be held in adjusted positions in a well known manner so that the shoes will be held engaged with the tires.

What is claimed is:—

The combination of a vehicle wheel having a hub, plates extending longitudinally of the spokes of said wheel, shoes pivoted to the outer ends of said plates and adjustable transversely of the tire of the wheel, a collar secured to the hub of the wheel and having arms extending therefrom, bell crank levers pivoted between said arms, rods pivoted to said shoes and bell crank levers, and a sleeve member adjustable longitudinally of the axis of rotation of the wheel and having a connection with said bell crank levers to rock the same about their pivots whereby to adjust said shoes.

In testimony whereof, I affix my signature, in the presence of two witnesses.

DURFEE O. PARISH.

Witnesses:
 JOHN P. LOOS,
 ANDREW HOLWEYNER.